United States Patent
Terada et al.

(10) Patent No.: US 10,501,374 B2
(45) Date of Patent: *Dec. 10, 2019

(54) DIELECTRIC COMPOSITION, DIELECTRIC ELEMENT, ELECTRONIC COMPONENT AND LAMINATED ELECTRONIC COMPONENT

(71) Applicant: TDK Electronics AG, München (DE)

(72) Inventors: Tomohiro Terada, Tokyo (JP); Yu Katagi, Tokyo (JP); Tomoya Imura, Tokyo (JP)

(73) Assignee: TDK ELECTRONICS AG, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/577,318

(22) PCT Filed: May 24, 2016

(86) PCT No.: PCT/EP2016/061712
§ 371 (c)(1),
(2) Date: Nov. 27, 2017

(87) PCT Pub. No.: WO2016/189005
PCT Pub. Date: Dec. 1, 2016

(65) Prior Publication Data
US 2018/0155249 A1    Jun. 7, 2018

(30) Foreign Application Priority Data
May 27, 2015    (JP) .................................. 2015-107735

(51) Int. Cl.
*C04B 35/475* (2006.01)
*H01G 4/12* (2006.01)
(Continued)

(52) U.S. Cl.
CPC ............ *C04B 35/475* (2013.01); *C04B 35/47* (2013.01); *C04B 35/638* (2013.01); *C04B 35/64* (2013.01);
(Continued)

(58) Field of Classification Search
CPC ............................ C04B 35/475; H01G 4/1227
See application file for complete search history.

(56) References Cited

U.S. PATENT DOCUMENTS 3,468,680 A    9/1969 Fujiwara
4,119,554 A    10/1978 Fujiwara
(Continued)

FOREIGN PATENT DOCUMENTS

CN    1814569 A    8/2006
CN    1814570 A    8/2006
(Continued)

OTHER PUBLICATIONS

Herabuta, A., et al., Effects of Substitution in A- and B-site Cations of Bi0.5Na0.5TiO3, Dept. of Ceramic Science and Engineering, IEEE, 1996, pp. 775-778.
(Continued)

*Primary Examiner* — Karl E Group
(74) *Attorney, Agent, or Firm* — Slater Matsil, LLP (57) ABSTRACT

The present invention relates to a dielectric composition having a main component and an auxiliary component. The main component is represented by $(Bi_aNa_bSr_cLn_d)TiO_3$, where Ln comprises a rare earth element $0.100 \leq a \leq 0.400$, $0.100 \leq b \leq 0.400$, $0.100 \leq c \leq 0.700$, $0 \leq d \leq 0.100$, and $0.900 \leq a+b+c+d \leq 1.50$. The auxiliary component contains a first auxiliary component or a second auxiliary component. The first auxiliary component includes an element selected from the group consisting of Li and K and combinations thereof and the second auxiliary component includes an element
(Continued)

selected from the group consisting of Cu, Zn, Mn, Mg and Co and combinations thereof.

10 Claims, 6 Drawing Sheets

(51) Int. Cl.
| | |
|---|---|
| *C04B 35/638* | (2006.01) |
| *H01G 4/30* | (2006.01) |
| *C04B 35/47* | (2006.01) |
| *C04B 35/64* | (2006.01) |
| *C04B 41/45* | (2006.01) |
| *H01G 4/008* | (2006.01) |
| *H01G 4/228* | (2006.01) |

(52) U.S. Cl.
CPC ......... *C04B 41/4578* (2013.01); *H01G 4/008* (2013.01); *H01G 4/1218* (2013.01); *H01G 4/1227* (2013.01); *H01G 4/228* (2013.01); *H01G 4/30* (2013.01); *C04B 2235/3201* (2013.01); *C04B 2235/3203* (2013.01); *C04B 2235/3206* (2013.01); *C04B 2235/3213* (2013.01); *C04B 2235/3224* (2013.01); *C04B 2235/3225* (2013.01); *C04B 2235/3227* (2013.01); *C04B 2235/3229* (2013.01); *C04B 2235/3236* (2013.01); *C04B 2235/3262* (2013.01); *C04B 2235/3275* (2013.01); *C04B 2235/3281* (2013.01); *C04B 2235/3284* (2013.01); *C04B 2235/3298* (2013.01); *C04B 2235/6025* (2013.01); *C04B 2235/656* (2013.01); *C04B 2235/80* (2013.01); *C04B 2237/595* (2013.01)

(56) References Cited

U.S. PATENT DOCUMENTS

| | | | |
|---|---|---|---|
| 8,043,987 | B2 | 10/2011 | Chen et al. |
| 8,786,167 | B2 * | 7/2014 | Kounga Njiwa ..... H01L 41/187 310/358 |
| 9,530,563 | B2 * | 12/2016 | Imura .................. H01G 4/1218 |
| 10,099,964 | B2 * | 10/2018 | Tauchi .................. C04B 35/462 |
| 2008/0242532 | A1 | 10/2008 | Nishikawa |
| 2017/0029337 | A1 * | 2/2017 | Imura .................. C04B 35/462 |
| 2017/0032893 | A1 * | 2/2017 | Tauchi .................. C04B 35/462 |
| 2017/0190627 | A1 * | 7/2017 | Tauchi .................. C04B 35/462 |
| 2017/0243696 | A1 * | 8/2017 | Hirose .................. C04B 35/47 |

FOREIGN PATENT DOCUMENTS

| | | |
|---|---|---|
| CN | 102201285 A | 9/2011 |
| EP | 1094477 A2 | 4/2001 |
| FR | 2276278 A1 | 1/1976 |
| JP | 2004182532 A | 7/2004 |
| JP | 2005022891 A * | 1/2005 |
| JP | 2007161538 A | 6/2007 |
| JP | 2008520541 A | 6/2008 |
| JP | 2014189465 A | 10/2014 |
| WO | 2014156302 A1 | 2/2014 |

OTHER PUBLICATIONS

Parija, B., et al., "Structure, microstructure and dielectric properties of 100-x (Bi0.5Na0.5)TiO3-x [SrTiO3] composites ceramics," Applied Physics A, Materials Science & Processing, Aug. 25, 2012, vol. 109, No. 3, pp. 715, 723.

Vintila, R., et al., "Effect of a-site substitutuins on the microstructure and dielectric properties of bismuth sodium titanate-based ceramics exhibiting morphotropic phase boundary," Advances in Electronic Ceramic Materials, a collection of papers presented at the 29th int'l conference, Jan. 23-28, 2005; vol. 26, No. 5, pp. 117-124.

Wang, L., et al., "Dielectric and Piezoelectric Properties of Lead-free BaTiO3—Bi(Zn0.5Ti0.5)O3 and (Bi0.5Na0.5) TiO3—Bi(Zn0.5Ti0.5)O3 Ceramics," Ferroelectrics, Taylor and Francis Inc., vol. 380, Jan. 1, 2009, pp. 177-182.

Duan, Cheng-Hui, et al., "Influence of Bi(Zn0.5Ti0.5)O3 on the Phase Structure and Relaxation Behavior of Bi0.5Na0.5TiO3-based Ceramics," Journal of Synthetic Crystals, vol. 43, No. 4, Apr. 2014, 5 pages.

Lin, Dun-Min et al., "Studies on Dielectric Properties and Microstructures of Bi0.5(Na1-x-yKxLiy)0.5 TiO3 Piezoelectric Ceramics," Electric Components and Materials, vol. 23, No. 11, Nov. 2004, 3 pages.

* cited by examiner

Table 1

| | Main component (Bi$_a$Na$_b$Sr$_c$Ln$_d$)TiO$_3$ (number of atoms when number of atoms of Ti = 1) | | | | | | Auxiliary component A (molar parts with respect to 100 molar parts of Ti) | | Auxiliary component B (molar parts with respect to 100 molar parts of Ti) | | | | | Total amount of auxiliary components (molar parts) | Dielectric constant @ 8 V/μm, 25°C | Dielectric constant @ 8 V/μm, 150°C | Withstand field @ 8 V/μm, 25°C | Withstand field @ 8 V/μm, 150°C |
|---|---|---|---|---|---|---|---|---|---|---|---|---|---|---|---|---|---|---|
| | a(Bi) | b(Na) | c(Sr) | d(Ln) | a+b+c+d | Ln | Li | K | Cu | Zn | Mn | Mg | Co | | | | | |
| Comparative Example 1 | 0.238 | 0.238 | 0.475 | 0.033 | 0.983 | La | 0.00 | 0.00 | 0.00 | 0.00 | 0.00 | 0.00 | 0.00 | 0.00 | 1650 | 830 | 31.0 | 25.0 |
| Exemplary Embodiment 1 | 0.238 | 0.238 | 0.475 | 0.033 | 0.983 | La | 0.48 | 0.00 | 0.00 | 0.00 | 0.00 | 0.00 | 0.00 | 0.48 | 1620 | 890 | 30.5 | 25.0 |
| Exemplary Embodiment 2 | 0.238 | 0.238 | 0.475 | 0.033 | 0.983 | La | 0.50 | 0.00 | 0.00 | 0.00 | 0.00 | 0.00 | 0.00 | 0.50 | 1590 | 920 | 30.1 | 24.5 |
| Exemplary Embodiment 3 | 0.238 | 0.238 | 0.475 | 0.033 | 0.983 | La | 1.00 | 0.00 | 0.00 | 0.00 | 0.00 | 0.00 | 0.00 | 1.00 | 1590 | 1005 | 30.0 | 20.5 |
| Exemplary Embodiment 4 | 0.238 | 0.238 | 0.475 | 0.033 | 0.983 | La | 4.00 | 0.00 | 0.00 | 0.00 | 0.00 | 0.00 | 0.00 | 4.00 | 1580 | 1230 | 29.7 | 18.5 |
| Exemplary Embodiment 5 | 0.238 | 0.238 | 0.475 | 0.033 | 0.983 | La | 4.90 | 0.00 | 0.00 | 0.00 | 0.00 | 0.00 | 0.00 | 4.90 | 1510 | 1010 | 28.5 | 17.6 |
| Exemplary Embodiment 6 | 0.238 | 0.238 | 0.475 | 0.033 | 0.983 | La | 5.00 | 0.00 | 0.00 | 0.00 | 0.00 | 0.00 | 0.00 | 5.00 | 1490 | 950 | 28.1 | 17.5 |
| Exemplary Embodiment 7 | 0.238 | 0.238 | 0.475 | 0.033 | 0.983 | La | 6.90 | 0.00 | 0.00 | 0.00 | 0.00 | 0.00 | 0.00 | 6.90 | 1370 | 920 | 18.3 | 16.5 |
| Exemplary Embodiment 8 | 0.238 | 0.238 | 0.475 | 0.033 | 0.983 | La | 7.00 | 0.00 | 0.00 | 0.00 | 0.00 | 0.00 | 0.00 | 7.00 | 1350 | 890 | 17.2 | 15.8 |
| Exemplary Embodiment 9 | 0.238 | 0.238 | 0.475 | 0.033 | 0.983 | Yb | 4.00 | 0.00 | 0.00 | 0.00 | 0.00 | 0.00 | 0.00 | 4.00 | 1570 | 1210 | 28.1 | 17.3 |
| Exemplary Embodiment 10 | 0.238 | 0.238 | 0.475 | 0.033 | 0.983 | Sm | 4.00 | 0.00 | 0.00 | 0.00 | 0.00 | 0.00 | 0.00 | 4.00 | 1490 | 1420 | 29.7 | 18.5 |
| Exemplary Embodiment 11 | 0.238 | 0.238 | 0.475 | 0.033 | 0.983 | Ce | 4.00 | 0.00 | 0.00 | 0.00 | 0.00 | 0.00 | 0.00 | 4.00 | 1420 | 1380 | 27.5 | 17.9 |
| Exemplary Embodiment 12 | 0.238 | 0.238 | 0.475 | 0.033 | 0.983 | La | 0.00 | 0.49 | 0.00 | 0.00 | 0.00 | 0.00 | 0.00 | 0.49 | 1520 | 860 | 28.5 | 18.5 |
| Exemplary Embodiment 13 | 0.238 | 0.238 | 0.475 | 0.033 | 0.983 | La | 0.00 | 0.50 | 0.00 | 0.00 | 0.00 | 0.00 | 0.00 | 0.50 | 1490 | 920 | 27.5 | 17.5 |
| Exemplary Embodiment 14 | 0.238 | 0.238 | 0.475 | 0.033 | 0.983 | La | 0.00 | 6.90 | 0.00 | 0.00 | 0.00 | 0.00 | 0.00 | 6.90 | 1480 | 910 | 25.4 | 16.5 |
| Exemplary Embodiment 15 | 0.238 | 0.238 | 0.475 | 0.033 | 0.983 | La | 0.00 | 7.00 | 0.00 | 0.00 | 0.00 | 0.00 | 0.00 | 7.00 | 1455 | 890 | 20.5 | 15.5 |
| Exemplary Embodiment 16 | 0.238 | 0.238 | 0.475 | 0.033 | 0.983 | La | 2.00 | 2.00 | 0.00 | 0.00 | 0.00 | 0.00 | 0.00 | 4.00 | 1510 | 1020 | 28.2 | 18.4 |
| Exemplary Embodiment 17 | 0.238 | 0.238 | 0.475 | 0.033 | 0.983 | La | 0.00 | 0.00 | 0.05 | 0.00 | 0.00 | 0.00 | 0.00 | 0.05 | 1480 | 910 | 25.2 | 18.5 |
| Exemplary Embodiment 18 | 0.238 | 0.238 | 0.475 | 0.033 | 0.983 | La | 0.00 | 0.00 | 0.10 | 0.00 | 0.00 | 0.00 | 0.00 | 0.10 | 1475 | 1020 | 24.6 | 17.4 |
| Exemplary Embodiment 19 | 0.238 | 0.238 | 0.475 | 0.033 | 0.983 | La | 0.00 | 0.00 | 3.00 | 0.00 | 0.00 | 0.00 | 0.00 | 3.00 | 1390 | 1030 | 24.1 | 17.0 |
| Exemplary Embodiment 20 | 0.238 | 0.238 | 0.475 | 0.033 | 0.983 | La | 0.00 | 0.00 | 4.90 | 0.00 | 0.00 | 0.00 | 0.00 | 4.90 | 1350 | 990 | 22.5 | 15.6 |
| Exemplary Embodiment 21 | 0.238 | 0.238 | 0.475 | 0.033 | 0.983 | La | 0.00 | 0.00 | 5.00 | 0.00 | 0.00 | 0.00 | 0.00 | 5.00 | 1340 | 860 | 13.5 | 16.6 |
| Exemplary Embodiment 22 | 0.238 | 0.238 | 0.475 | 0.033 | 0.983 | La | 0.00 | 0.00 | 0.00 | 2.00 | 0.00 | 0.00 | 0.00 | 2.00 | 1410 | 1015 | 24.6 | 19.3 |
| Exemplary Embodiment 23 | 0.238 | 0.238 | 0.475 | 0.033 | 0.983 | La | 0.00 | 0.00 | 0.00 | 0.00 | 2.00 | 0.00 | 0.00 | 2.00 | 1415 | 1024 | 23.4 | 18.6 |
| Exemplary Embodiment 24 | 0.238 | 0.238 | 0.475 | 0.033 | 0.983 | La | 0.00 | 0.00 | 0.00 | 0.00 | 0.00 | 2.00 | 0.00 | 2.00 | 1422 | 1020 | 23.2 | 18.8 |
| Exemplary Embodiment 25 | 0.238 | 0.238 | 0.475 | 0.033 | 0.983 | La | 0.00 | 0.00 | 0.00 | 0.00 | 0.00 | 0.00 | 2.00 | 2.00 | 1395 | 1010 | 25.1 | 19.1 |
| Exemplary Embodiment 26 | 0.238 | 0.238 | 0.475 | 0.033 | 0.983 | La | 0.00 | 0.00 | 2.00 | 0.50 | 0.00 | 0.00 | 0.00 | 2.50 | 1475 | 1020 | 24.2 | 17.4 |
| Exemplary Embodiment 27 | 0.238 | 0.238 | 0.475 | 0.033 | 0.983 | La | 0.00 | 0.00 | 2.00 | 0.00 | 0.50 | 0.00 | 0.00 | 2.50 | 1465 | 1015 | 23.8 | 18.1 |
| Exemplary Embodiment 28 | 0.238 | 0.238 | 0.475 | 0.033 | 0.983 | La | 0.00 | 0.00 | 2.00 | 0.00 | 0.00 | 0.50 | 0.00 | 2.50 | 1480 | 1005 | 24.1 | 17.9 |
| Exemplary Embodiment 29 | 0.238 | 0.238 | 0.475 | 0.033 | 0.983 | La | 0.00 | 0.00 | 2.00 | 0.00 | 0.00 | 0.00 | 0.50 | 2.50 | 1475 | 1010 | 24.2 | 18.4 |

Figure 4

Table 2

| | Main component (Bi,Na,Sr,Ln)TiO$_3$ (number of atoms when number of atoms of Ti = 1) | | | | | | Auxiliary component A (molar parts with respect to 100 molar parts of Ti) | | Auxiliary component B (molar parts with respect to 100 molar parts of Ti) | | | | | | Total amount of auxiliary components (molar parts) | Dielectric constant @ 8 V/μm, 25°C | Dielectric constant @ 8 V/μm, 150°C | Withstand field @ 8 V/μm, 25°C | Withstand field @ 8 V/μm, 150°C |
|---|---|---|---|---|---|---|---|---|---|---|---|---|---|---|---|---|---|---|---|
| | | a(Bi) | b(Na) | c(Sr) | d(Ln) | a+b+c+d | Ln | Li | K | Cu | Zn | Mn | Mg | Co | | | | | |
| Exemplary Embodiment 30 | | 0.238 | 0.238 | 0.475 | 0.033 | 0.983 | La | 4.00 | 0.00 | 2.00 | 0.00 | 0.00 | 0.00 | 0.00 | 6.00 | 1620 | 1060 | 22.2 | 17.1 |
| Exemplary Embodiment 31 | | 0.238 | 0.238 | 0.475 | 0.033 | 0.983 | La | 4.80 | 0.00 | 0.20 | 0.00 | 0.00 | 0.00 | 0.00 | 5.00 | 1635 | 1055 | 24.1 | 18.2 |
| Exemplary Embodiment 32 | | 0.238 | 0.238 | 0.475 | 0.033 | 0.983 | La | 4.80 | 0.00 | 5.20 | 0.00 | 0.00 | 0.00 | 0.00 | 10.00 | 1230 | 890 | 17.2 | 15.6 |
| Exemplary Embodiment 33 | | 0.238 | 0.238 | 0.475 | 0.033 | 0.983 | La | 0.00 | 4.00 | 0.00 | 6.00 | 0.00 | 0.00 | 0.00 | 10.00 | 1450 | 855 | 18.8 | 15.4 |
| Exemplary Embodiment 34 | | 0.238 | 0.238 | 0.475 | 0.033 | 0.981 | La | 1.00 | 0.00 | 0.00 | 0.00 | 0.00 | 4.00 | 0.00 | 5.00 | 1530 | 960 | 19.1 | 17.2 |
| Comparative Example 5 | | 0.400 | 0.350 | 0.150 | 0.033 | 0.933 | La | 0.00 | 0.00 | 0.00 | 0.00 | 0.00 | 0.00 | 0.00 | *0.00* | 1610 | *840* | 17.5 | 16.5 |
| Comparative Example 6 | | *0.410* | 0.350 | 0.150 | 0.033 | 0.943 | La | 4.00 | 0.00 | 0.00 | 0.00 | 0.00 | 0.00 | 0.00 | 4.00 | 1180 | 1615 | *14.6* | *12.1* |
| Exemplary Embodiment 35 | | 0.400 | 0.350 | 0.150 | 0.033 | 0.933 | La | 4.00 | 0.00 | 0.00 | 0.00 | 0.00 | 0.00 | 0.00 | 4.00 | 1180 | 1620 | 16.5 | 15.5 |
| Exemplary Embodiment 36 | | 0.400 | 0.350 | 0.150 | 0.033 | 0.933 | La | 0.00 | 0.00 | 2.00 | 0.00 | 0.00 | 0.00 | 0.00 | 2.00 | 1190 | 1590 | 15.8 | 15.4 |
| Exemplary Embodiment 37 | | 0.400 | 0.350 | 0.150 | 0.033 | 0.933 | La | 4.00 | 0.00 | 0.00 | 2.00 | 0.00 | 0.00 | 0.00 | 4.00 | 1180 | 1530 | 15.7 | 16.5 |
| Exemplary Embodiment 38 | | 0.400 | 0.350 | 0.150 | 0.033 | 0.933 | Yb | 4.00 | 0.00 | 0.00 | 0.00 | 0.00 | 0.00 | 0.00 | 4.00 | 1195 | 1620 | 16.1 | 15.2 |
| Exemplary Embodiment 39 | | 0.400 | 0.350 | 0.150 | 0.033 | 0.933 | Sm | 4.00 | 0.00 | 0.00 | 0.00 | 0.00 | 0.00 | 0.00 | 4.00 | 1180 | 1810 | 16.4 | 15.4 |
| Exemplary Embodiment 40 | | 0.400 | 0.350 | 0.150 | 0.033 | 0.933 | Ce | 4.00 | 0.00 | 0.00 | 0.00 | 0.00 | 0.00 | 0.00 | 4.00 | 1185 | 1590 | 15.9 | 15.6 |
| Comparative Example 7 | | 0.350 | 0.400 | 0.150 | 0.033 | 0.933 | La | 4.00 | 0.00 | 0.00 | 0.00 | 0.00 | 0.00 | 0.00 | *0.00* | 1620 | *835* | 19.2 | 17.9 |
| Comparative Example 8 | | 0.350 | *0.410* | 0.150 | 0.033 | 0.943 | La | 4.00 | 0.00 | 0.00 | 0.00 | 0.00 | 0.00 | 0.00 | 4.00 | 1180 | 1615 | *14.3* | *12.2* |
| Exemplary Embodiment 41 | | 0.350 | 0.400 | 0.150 | 0.033 | 0.933 | La | 4.00 | 0.00 | 0.00 | 0.00 | 0.00 | 0.00 | 0.00 | 4.00 | 1190 | 1605 | 16.7 | 16.0 |
| Exemplary Embodiment 42 | | 0.350 | 0.400 | 0.150 | 0.033 | 0.933 | La | 0.00 | 0.00 | 0.00 | 2.00 | 2.00 | 0.00 | 0.00 | 4.00 | 1180 | 1590 | 16.9 | 15.8 |
| Exemplary Embodiment 43 | | 0.350 | 0.400 | 0.150 | 0.033 | 0.933 | La | 0.00 | 0.00 | 0.00 | 0.00 | 2.00 | 0.00 | 0.00 | 2.00 | 1180 | 1540 | 17.1 | 15.6 |
| Comparative Example 9 | | 0.125 | 0.125 | *0.710* | 0.033 | 0.993 | La | 0.00 | 0.00 | 0.00 | 0.00 | 0.00 | 0.00 | 0.00 | *0.00* | 1010 | *750* | 26.5 | 24.9 |
| Comparative Example 10 | | 0.125 | 0.125 | 0.700 | 0.033 | 0.983 | La | 4.00 | 4.00 | 0.00 | 0.00 | 0.00 | 0.00 | 0.00 | 4.00 | 920 | *700* | 26.7 | 25.1 |
| Exemplary Embodiment 44 | | 0.125 | 0.125 | 0.700 | 0.033 | 0.983 | La | 0.00 | 4.00 | 0.00 | 0.00 | 0.00 | 0.00 | 0.00 | 4.00 | 910 | 905 | 24.5 | 23.5 |
| Exemplary Embodiment 45 | | 0.125 | 0.125 | 0.700 | 0.033 | 0.983 | La | 0.00 | 0.00 | 0.00 | 0.00 | 2.00 | 0.00 | 0.00 | 2.00 | 915 | 905 | 23.7 | 23.4 |
| Exemplary Embodiment 46 | | 0.125 | 0.125 | 0.700 | 0.033 | 0.983 | La | 0.00 | 0.00 | 0.00 | 0.00 | 0.00 | 0.00 | 2.00 | 2.00 | 910 | 905 | 24.1 | 23.0 |
| Comparative Example 11 | | 0.225 | 0.225 | 0.400 | 0.100 | 0.950 | La | 4.00 | 0.00 | 0.00 | 0.00 | 0.00 | 0.00 | 0.00 | 4.00 | 970 | 730 | 26.4 | 23.6 |
| Comparative Example 12 | | 0.225 | 0.225 | 0.400 | *0.110* | 0.960 | La | 0.00 | 0.00 | 0.00 | 0.00 | 0.00 | 0.00 | 0.00 | *0.00* | *880* | *720* | 25.5 | 24.9 |
| Exemplary Embodiment 47 | | 0.225 | 0.225 | 0.400 | 0.100 | 0.950 | La | 4.00 | 0.00 | 0.00 | 0.00 | 0.00 | 0.00 | 0.00 | 4.00 | 940 | 905 | 24.4 | 20.6 |
| Exemplary Embodiment 48 | | 0.225 | 0.225 | 0.400 | 0.100 | 0.950 | La | 0.00 | 0.00 | 0.00 | 2.00 | 0.00 | 0.00 | 0.00 | 2.00 | 950 | 910 | 23.5 | 19.8 |
| Exemplary Embodiment 49 | | 0.225 | 0.225 | 0.400 | 0.100 | 0.950 | La | 4.00 | 0.00 | 0.00 | 0.00 | 0.00 | 0.00 | 0.00 | 4.00 | 945 | 915 | 24.1 | 20.8 |
| Exemplary Embodiment 50 | | 0.238 | 0.238 | 0.525 | 0.050 | 1.050 | La | 4.00 | 0.00 | 0.00 | 0.00 | 0.00 | 0.00 | 0.00 | 4.00 | 1190 | 1010 | 15.9 | 15.5 |
| Comparative Example 13 | | 0.238 | 0.238 | 0.535 | 0.050 | *1.062* | La | 4.00 | 0.00 | 0.00 | 0.00 | 0.00 | 0.00 | 0.00 | 4.00 | 1190 | 905 | *12.5* | *12.1* |

Figure 5

Table 3

| | | Main component: (Bi,Na,Sr,Ln)TiO₃ (number of atoms when number of atoms of Ti = 1) | | | | | | Auxiliary component A (molar parts with respect to 100 molar parts of Ti) | | Auxiliary component B (molar parts with respect to 100 molar parts of Ti) | | | | | Total amount of auxiliary components (molar parts) | Dielectric constant @ 8 V/μm, 25°C | Dielectric constant @ 8 V/μm, 150°C | Withstand field @ 8 V/μm, 25°C | Withstand field @ 8 V/μm, 150°C |
|---|---|---|---|---|---|---|---|---|---|---|---|---|---|---|---|---|---|---|---|
| | | a(Bi) | b(Na) | c(Sr) | d(Ln) | a+b+c+d | Ln | Li | K | Cu | Zn | Mn | Mg | Ca | | | | | |
| Comparative Example | 14 | 0.100 | 0.110 | 0.675 | 0.083 | 0.968 | La | 0.00 | 0.00 | 0.00 | 0.00 | 0.00 | 0.00 | 0.00 | 0.00 | 985 | 720 | 22.5 | 20.5 |
| Comparative Example | 15 | 0.090 | 0.110 | 0.675 | 0.083 | 0.958 | La | 0.00 | 4.00 | 0.00 | 0.00 | 0.00 | 0.00 | 0.00 | 4.00 | 890 | 710 | 23.5 | 22.0 |
| Exemplary Embodiment | 51 | 0.100 | 0.110 | 0.675 | 0.083 | 0.968 | La | 0.00 | 4.00 | 0.00 | 0.00 | 0.00 | 0.00 | 0.00 | 4.00 | 950 | 910 | 20.0 | 19.8 |
| Exemplary Embodiment | 52 | 0.100 | 0.110 | 0.675 | 0.083 | 0.968 | La | 0.00 | 0.00 | 0.00 | 0.00 | 2.00 | 0.00 | 0.00 | 2.00 | 965 | 915 | 20.5 | 18.5 |
| Comparative Example | 16 | 0.110 | 0.100 | 0.675 | 0.083 | 0.968 | La | 0.00 | 0.00 | 0.00 | 0.00 | 0.00 | 0.00 | 0.00 | 0.00 | 980 | 715 | 24.5 | 21.5 |
| Comparative Example | 17 | 0.110 | 0.090 | 0.675 | 0.083 | 0.958 | La | 4.00 | 0.00 | 0.00 | 0.00 | 0.00 | 0.00 | 0.00 | 4.00 | 875 | 705 | 23.4 | 21.2 |
| Exemplary Embodiment | 53 | 0.110 | 0.100 | 0.675 | 0.083 | 0.968 | La | 4.00 | 0.00 | 0.00 | 0.00 | 0.00 | 0.00 | 0.00 | 4.00 | 935 | 920 | 20.5 | 19.5 |
| Exemplary Embodiment | 54 | 0.110 | 0.100 | 0.675 | 0.083 | 0.968 | La | 0.00 | 0.00 | 2.00 | 0.00 | 0.00 | 0.00 | 0.00 | 2.00 | 950 | 935 | 21.2 | 18.8 |
| Comparative Example | 18 | 0.388 | 0.388 | 0.100 | 0.083 | 0.958 | La | 0.00 | 0.00 | 0.00 | 0.00 | 2.00 | 0.00 | 0.00 | 2.00 | 1150 | 825 | 17.8 | 16.1 |
| Exemplary Embodiment | 19 | 0.388 | 0.388 | 0.092 | 0.083 | 0.948 | La | 0.00 | 0.00 | 0.00 | 0.00 | 4.00 | 0.00 | 0.00 | 4.00 | 1135 | 830 | 14.6 | 12.4 |
| Exemplary Embodiment | 55 | 0.388 | 0.388 | 0.100 | 0.083 | 0.958 | La | 3.00 | 0.00 | 0.00 | 0.00 | 0.00 | 0.00 | 0.00 | 3.00 | 1085 | 980 | 17.2 | 15.5 |
| Exemplary Embodiment | 56 | 0.388 | 0.388 | 0.100 | 0.083 | 0.958 | La | 0.00 | 0.00 | 0.00 | 0.00 | 2.00 | 0.00 | 0.00 | 2.00 | 1094 | 985 | 17.4 | 16.2 |
| Comparative Example | 20 | 0.250 | 0.250 | 0.500 | 0 | 1.000 | La | 0.00 | 4.00 | 0.00 | 0.00 | 0.00 | 0.00 | 0.00 | 4.00 | 1420 | 835 | 21.5 | 20.5 |
| Exemplary Embodiment | 57 | 0.250 | 0.250 | 0.500 | 0.050 | 0.990 | La | 0.00 | 4.00 | 0.00 | 0.00 | 0.00 | 0.00 | 0.00 | 4.00 | 1460 | 910 | 20.4 | 19.8 |
| Exemplary Embodiment | 58 | 0.225 | 0.238 | 0.375 | 0.050 | 0.890 | La | 4.00 | 0.00 | 0.00 | 0.00 | 0.00 | 0.00 | 0.00 | 4.00 | 1185 | 990 | 15.9 | 15.5 |
| Comparative Example | 21 | 0.238 | 0.227 | 0.375 | 0.033 | 0.890 | La | 4.00 | 0.00 | 0.00 | 0.00 | 0.00 | 0.00 | 0.00 | 4.00 | 1170 | 885 | 13.5 | 12.7 |
| Exemplary Embodiment | 59 | 0.175 | 0.175 | 0.600 | 0.033 | 0.983 | La | 4.00 | 0.00 | 0.00 | 0.00 | 0.00 | 0.00 | 0.00 | 4.00 | 1205 | 1010 | 22.4 | 20.5 |
| Exemplary Embodiment | 60 | 0.175 | 0.175 | 0.600 | 0.033 | 0.983 | La | 0.00 | 0.00 | 0.00 | 2.00 | 0.00 | 0.00 | 0.00 | 2.00 | 1210 | 1005 | 23.1 | 19.7 |
| Exemplary Embodiment | 61 | 0.250 | 0.250 | 0.380 | 0.080 | 0.960 | La | 4.00 | 0.00 | 0.00 | 0.00 | 0.00 | 0.00 | 0.00 | 4.00 | 1240 | 1070 | 21.5 | 20.1 |
| Exemplary Embodiment | 62 | 0.250 | 0.250 | 0.380 | 0.080 | 0.960 | La | 0.00 | 0.00 | 2.00 | 0.00 | 0.00 | 0.00 | 0.00 | 2.00 | 1240 | 1070 | 21.5 | 20.1 |
| Exemplary Embodiment | 63 | 0.370 | 0.370 | 0.150 | 0.073 | 0.963 | La | 0.00 | 4.00 | 0.00 | 0.00 | 0.00 | 0.00 | 0.00 | 4.00 | 1270 | 1350 | 18.5 | 17.1 |
| Exemplary Embodiment | 64 | 0.370 | 0.370 | 0.150 | 0.073 | 0.963 | La | 0.00 | 4.00 | 0.00 | 0.00 | 0.00 | 0.00 | 0.00 | 4.00 | 1290 | 1245 | 18.4 | 17.6 |
| Exemplary Embodiment | 65 | 0.375 | 0.375 | 0.200 | 0.033 | 0.983 | La | 0.00 | 4.00 | 0.00 | 0.00 | 0.00 | 0.00 | 0.00 | 4.00 | 1265 | 1380 | 18.1 | 17.8 |
| Exemplary Embodiment | 66 | 0.375 | 0.375 | 0.200 | 0.033 | 0.983 | La | 0.00 | 0.00 | 0.00 | 0.00 | 4.00 | 0.00 | 0.00 | 4.00 | 1245 | 1355 | 19.2 | 17.8 |
| Exemplary Embodiment | 67 | 0.300 | 0.300 | 0.385 | 0.010 | 0.995 | La | 4.00 | 0.00 | 0.00 | 0.00 | 0.00 | 0.00 | 0.00 | 4.00 | 1255 | 1250 | 24.9 | 21.5 |
| Exemplary Embodiment | 68 | 0.300 | 0.300 | 0.385 | 0.010 | 0.995 | La | 0.00 | 0.00 | 2.00 | 0.00 | 0.00 | 0.00 | 0.00 | 2.00 | 1260 | 1245 | 24.9 | 21.5 |
| Exemplary Embodiment | 69 | 0.160 | 0.150 | 0.580 | 0.073 | 0.963 | La | 0.00 | 4.00 | 0.00 | 0.00 | 0.00 | 0.00 | 0.00 | 4.00 | 1205 | 1110 | 26.7 | 24.1 |
| Exemplary Embodiment | 70 | 0.150 | 0.180 | 0.580 | 0.050 | 0.963 | La | 0.00 | 0.00 | 0.00 | 0.00 | 0.00 | 2.00 | 0.00 | 2.00 | 1215 | 1105 | 25.9 | 23.7 |
| Exemplary Embodiment | 71 | 0.170 | 0.170 | 0.530 | 0.060 | 0.920 | La | 4.00 | 0.00 | 0.00 | 0.00 | 0.00 | 0.00 | 0.00 | 4.00 | 1215 | 1010 | 17.1 | 16.3 |
| Exemplary Embodiment | 72 | 0.238 | 0.238 | 0.495 | 0.050 | 1.020 | La | 4.00 | 0.00 | 0.00 | 0.00 | 0.00 | 0.00 | 0.00 | 4.00 | 1225 | 1020 | 17.2 | 16.7 |

Figure 6

Table 4

| | Main Component $(Bi_aNa_bSr_cLn_d)TiO_3$ (number of atoms when number of atoms of Ti=1) | | | | | | Auxiliary Component A (molar parts with respect to 100 molar parts of Ti) | | Auxiliary Component B (molar parts with respect to 100 molar parts of Ti) | | | | | Total amount of auxiliary components (molar parts) | Dielectric constant @8V/μm, 25°C | Dielectric constant @8V/μm, 150°C | Withstand field (V/μm) @25°C | Withstand field (V/μm) @150°C |
|---|---|---|---|---|---|---|---|---|---|---|---|---|---|---|---|---|---|---|
| | a(Bi) | b(Na) | c(Sr) | d(Ln) | a+b+c+d | Ln | Li | K | Cu | Zn | Mn | Mg | Co | | | | | |
| Exemplary Embodiment | 0.315 | 0.315 | 0.270 | 0.067 | 0.967 | Y | 6.00 | 0.00 | 0.00 | 0.00 | 0.00 | 0.00 | 0.00 | 6.00 | 1090 | 1060 | 21.7 | 20.2 |
| Exemplary Embodiment | 0.315 | 0.315 | 0.270 | 0.067 | 0.967 | La | 4.00 | 0.00 | 0.00 | 0.00 | 0.00 | 0.00 | 0.00 | 4.00 | 1842 | 1863 | 18.8 | 18.6 |
| Exemplary Embodiment | 0.315 | 0.315 | 0.270 | 0.067 | 0.967 | Ce | 6.50 | 0.00 | 0.00 | 0.00 | 0.00 | 0.00 | 0.00 | 6.50 | 933 | 922 | 21.2 | 20.3 |
| Exemplary Embodiment | 0.315 | 0.315 | 0.270 | 0.067 | 0.967 | Pr | 4.00 | 0.00 | 0.00 | 0.00 | 0.00 | 0.00 | 0.00 | 4.00 | 1375 | 1439 | 20.1 | 19.5 |
| Exemplary Embodiment | 0.315 | 0.315 | 0.270 | 0.067 | 0.967 | Nd | 4.00 | 0.00 | 0.00 | 0.00 | 0.00 | 0.00 | 0.00 | 4.00 | 1429 | 1455 | 19.6 | 19.3 |
| Exemplary Embodiment | 0.315 | 0.315 | 0.270 | 0.067 | 0.967 | Sm | 4.00 | 0.00 | 0.00 | 0.00 | 0.00 | 0.00 | 0.00 | 4.00 | 1512 | 1587 | 19.2 | 19.0 |
| Exemplary Embodiment | 0.315 | 0.315 | 0.270 | 0.067 | 0.967 | Gd | 5.50 | 0.00 | 0.00 | 0.00 | 0.00 | 0.00 | 0.00 | 5.50 | 1101 | 1089 | 20.3 | 19.4 |
| Exemplary Embodiment | 0.315 | 0.315 | 0.270 | 0.067 | 0.967 | Tb | 5.50 | 0.00 | 0.00 | 0.00 | 0.00 | 0.00 | 0.00 | 5.50 | 1026 | 972 | 20.9 | 20.5 |
| Exemplary Embodiment | 0.315 | 0.315 | 0.270 | 0.067 | 0.967 | Dy | 6.50 | 0.00 | 0.00 | 0.00 | 0.00 | 0.00 | 0.00 | 6.50 | 955 | 901 | 22.2 | 21.9 |
| Exemplary Embodiment | 0.315 | 0.315 | 0.270 | 0.067 | 0.967 | Ho | 6.50 | 0.00 | 0.00 | 0.00 | 0.00 | 0.00 | 0.00 | 6.50 | 1032 | 1007 | 21.6 | 21.1 |
| Exemplary Embodiment | 0.315 | 0.315 | 0.270 | 0.067 | 0.967 | Er | 6.00 | 0.00 | 0.00 | 0.00 | 0.00 | 0.00 | 0.00 | 6.00 | 1044 | 1072 | 20.4 | 19.7 |
| Exemplary Embodiment | 0.315 | 0.315 | 0.270 | 0.067 | 0.967 | Yb | 6.00 | 0.00 | 0.00 | 0.00 | 0.00 | 0.00 | 0.00 | 6.00 | 1030 | 1226 | 18.8 | 18.4 |
| Exemplary Embodiment | 0.301 | 0.301 | 0.324 | 0.050 | 0.975 | Pr | 4.00 | 0.00 | 0.00 | 0.00 | 0.00 | 0.00 | 0.00 | 4.00 | 1497 | 1575 | 19.1 | 18.6 |
| Exemplary Embodiment | 0.301 | 0.301 | 0.324 | 0.050 | 0.975 | Nd | 4.00 | 0.00 | 0.00 | 0.00 | 0.00 | 0.00 | 0.00 | 4.00 | 1294 | 1348 | 19.5 | 18.9 |
| Exemplary Embodiment | 0.301 | 0.301 | 0.324 | 0.050 | 0.975 | Sm | 4.00 | 0.00 | 0.00 | 0.00 | 0.00 | 0.00 | 0.00 | 4.00 | 1548 | 1603 | 18.8 | 18.3 |
| Exemplary Embodiment | 0.317 | 0.317 | 0.272 | 0.049 | 0.956 | La | 4.00 | 0.00 | 0.00 | 0.00 | 0.00 | 0.00 | 0.00 | 4.00 | 1810 | 1903 | 19.8 | 18.1 |
| Exemplary Embodiment | 0.324 | 0.324 | 0.278 | 0.050 | 0.975 | La | 4.00 | 0.00 | 0.25 | 0.00 | 0.00 | 0.00 | 0.00 | 4.25 | 1909 | 2017 | 19.1 | 18.5 |
| Exemplary Embodiment | 0.330 | 0.330 | 0.283 | 0.051 | 0.995 | La | 4.00 | 0.00 | 0.25 | 0.00 | 0.00 | 0.00 | 0.00 | 4.25 | 1842 | 1995 | 19.2 | 18.3 |
| Exemplary Embodiment | 0.315 | 0.315 | 0.270 | 0.067 | 0.967 | La | 4.00 | 0.00 | 0.25 | 0.00 | 0.00 | 0.00 | 0.00 | 4.25 | 1778 | 1805 | 17.2 | 16.5 |
| Exemplary Embodiment | 0.315 | 0.315 | 0.270 | 0.067 | 0.967 | La | 0.00 | 0.00 | 0.00 | 0.00 | 0.25 | 0.00 | 0.00 | 0.25 | 1604 | 1613 | 17.5 | 16.9 |
| Exemplary Embodiment | 0.315 | 0.315 | 0.270 | 0.067 | 0.967 | La,Nd (1:1) | 4.00 | 0.00 | 0.00 | 0.00 | 0.00 | 0.25 | 0.00 | 0.25 | 1628 | 1892 | 19.0 | 18.8 |
| Exemplary Embodiment | 0.315 | 0.315 | 0.270 | 0.067 | 0.967 | La,Dy (1:1) | 4.50 | 0.00 | 0.00 | 0.00 | 0.00 | 0.00 | 0.00 | 4.50 | 1204 | 1465 | 20.3 | 20.9 |

Figure 7

DIELECTRIC COMPOSITION, DIELECTRIC ELEMENT, ELECTRONIC COMPONENT AND LAMINATED ELECTRONIC COMPONENT

This patent application is a national phase filing under section 371 of PCT/EP2016/061712, filed May 24, 2016, which claims the priority of Japanese patent application 2015-107735, filed May 27, 2015, each of which is incorporated herein by reference in its entirety.

TECHNICAL FIELD

The present invention relates to a dielectric composition, a dielectric element, an electronic component and a laminated electronic component.

BACKGROUND

Laminated electronic components such as laminated ceramic capacitors are widely used as compact, large-capacity and highly reliable electronic components. As electronic circuits have reached higher density in recent years, there has been an increasingly strong demand for miniaturization of dielectric elements. Furthermore, as miniaturization and increased capacity of laminated electronic components such as laminated ceramic capacitors have sharply advanced, so the range of applications has also expanded. As the range of applications of laminated electronic components has expanded, various characteristics have come to be required of these laminated electronic components.

For example, medium- and high-voltage capacitors which are used in devices such as engine control modules (ECMs), fuel injection devices, electronic control throttles, inverters, converters, high-intensity discharge (HID) headlamp units, hybrid engine battery control units and digital still cameras often have a rated voltage in excess of 100 V because they are used in circuits for providing a high voltage boost. Medium- and high-voltage capacitors such as these need a high dielectric constant and high capacitance when a high DC bias is applied. Furthermore, when these medium- and high-voltage capacitors are used in a motor vehicle or industrial equipment etc., there is also a need for a high dielectric constant and high capacitance not only for application of a high DC bias but also for use under a high-temperature environment.

However, conventional dielectric compositions are designed on the assumption that they will be used when a low DC bias is applied. This means that if an electronic component having a dielectric layer comprising a conventional dielectric composition is used when a high DC bias is applied, there is a problem in that the dielectric constant and the capacitance are reduced. This problem becomes more marked the higher the DC bias, especially in laminated ceramic capacitors which have very thin layers, because the dielectric constant and capacitance tend to decrease.

In order to solve the abovementioned problem, Japanese patent document JP 3334607 B2 mentioned below describes a dielectric porcelain composition which contains a main component comprising: barium titanate having an alkali metal oxide content of 0.02 wt % or less; at least one compound selected from among europium oxide, gadolinium oxide, terbium oxide, dysprosium oxide, holmium oxide, erbium oxide, thulium oxide, and ytterbium oxide; barium zirconate, magnesium oxide and manganese oxide; said main component being represented by the following compositional formula: $\{BaO\}_m TiO_2 + \alpha R_2O_3 + \beta BaZrO_3 + \gamma MgO + gMnO$ (where $R_2O_3$ is at least one compound selected from among $Eu_2O_3$, $Gd_2O_3$, $Tb_2O_3$, $Dy_2O_3$, $Ho_2O_3$, $Er_2O_3$, $Tm_2O_3$ and $Yb_2O_3$; and $\alpha$, $\beta$, $\gamma$, and g represent a mole ratio and are within the following ranges: $0.001 \leq \alpha \leq 0.06$, $0.005 \leq \beta \leq 0.06$, $0.001 < \gamma \leq 0.12$, $0.001 < g \leq 0.12$, $\gamma + g \leq 0.13$, and $1.000 < m \leq 1.035$); and said dielectric composition contains, as an auxiliary component, silicon oxide in an amount of 0.2-5.0 mol as $SiO_2$ equivalent, with respect to 100 mol of the main component.

A dielectric porcelain composition such as that described in Japanese patent document JP3334607 B2 has a relatively large dielectric constant when a DC bias of 5 V/µm is applied. However, it is not possible to achieve satisfactory characteristics with the dielectric porcelain composition described in Japanese patent document JP3334607 B2 in a laminated electronic component having thinner layers in order to respond to an even greater degree of compactness and higher capacity in a medium- and high-voltage capacitor. It is not possible to achieve a high dielectric constant when a high DC bias of the order of 8 V/µm is applied at room temperature to the dielectric porcelain composition described in Japanese patent document JP 3334607 B2. In addition, a high dielectric constant cannot be achieved when a high DC bias of the order of 8 V/µm is applied at high temperature.

Furthermore, there is a possibility of breakdown of the dielectric composition occurring in a conventional dielectric composition due to the application of a high DC bias. A superior withstand field that does not produce breakdown is also required for when a high DC bias is applied.

SUMMARY OF THE INVENTION

Embodiments of the present invention relate to a dielectric composition, a dielectric element, an electronic component and a laminated electronic component which can advantageously be used for medium- and high-voltage applications with a high rated voltage, and can also advantageously be used under a high-temperature environment.

In view of the situation outlined above, embodiments of the present invention provide a dielectric composition which is advantageously used for medium- and high-voltage applications with a relatively high rated voltage, which has a high dielectric constant when a high DC bias is applied, both in the region of room temperature and at high temperatures, and which also has superior withstand field characteristics, and also in providing a dielectric element employing said dielectric composition, an electronic component, and a laminated electronic component. In order to achieve the abovementioned aim, a dielectric composition according to the present invention contains a main component and an auxiliary component. The main component is represented by $(Bi_a Na_b Sr_c Ln_d)TiO_3$; where Ln is at least one selected from among rare earth elements;

a, b, c and d satisfy the following: $0.100 \leq a \leq 0.400$, $0.100 \leq b \leq 0.400$, $0.100 \leq c \leq 0.700$, $0 \leq d \leq 0.100$ and $0.900 \leq a+b+c+d \leq 1.050$;

the auxiliary component contains a first auxiliary component and/or a second auxiliary component;

the first auxiliary component comprises at least one selected from the group consisting of Li and K; and the second auxiliary component comprises at least one selected from the group consisting of Cu, Zn, Mn, Mg and Co.

The dielectric composition according to the present invention exhibits a high dielectric constant both in the region of room temperature and at high temperatures when a high DC bias is applied, and also demonstrates a superior withstand field both in the region of room temperature and at high temperatures.

The first auxiliary component is preferably contained in an amount of at least 0.5 molar parts and less than 7 molar parts, with respect to 100 molar parts of Ti contained in the main component.

The second auxiliary component is preferably contained in an amount of at least 0.05 molar parts and less than 5 molar parts, with respect to 100 molar parts of Ti contained in the main component.

A dielectric element according to the present invention is provided with the abovementioned dielectric composition.

The dielectric element according to the present invention is provided with the abovementioned dielectric composition, and can be made more compact and higher performing as a result.

An electronic component according to the present invention has a dielectric layer comprising the abovementioned dielectric composition.

A laminated electronic component according to the present invention has a laminated portion formed by alternately laminating an internal electrode layer and a dielectric layer comprising the abovementioned dielectric composition.

BRIEF DESCRIPTION OF THE DRAWINGS

FIGS. 4-7 illustrate tables that include information for three exemplary embodiments.

DETAILED DESCRIPTION OF ILLUSTRATIVE EMBODIMENTS

A preferred mode of embodiment of the present invention will be described below with reference to FIG. 1.

Figure 1:
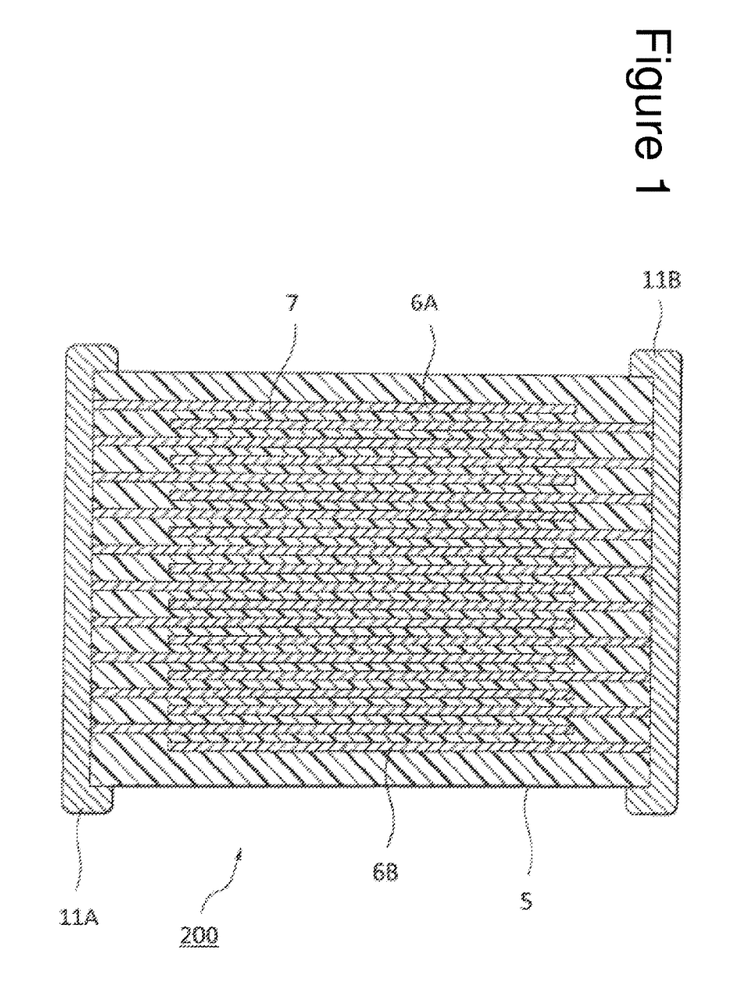
FIG. 1 is a view in cross section of a laminated ceramic capacitor according to a mode of embodiment of the present invention.

FIG. 1 is a view in cross section of a laminated ceramic capacitor according to a mode of embodiment of the present invention. A laminated ceramic capacitor 200 comprises a capacitor element main body 5 having a structure in which dielectric layers 7 and internal electrode layers 6A, 6B are alternately stacked. A pair of terminal electrodes 11A, 11B which conduct with the internal electrode layers 6A, 6B disposed alternately inside the element main body 5 are formed at both ends of the element main body 5. Although there is no particular limitation as to the shape of the element main body 5, it is normally a cuboid shape. Furthermore, there is no particular limitation as to the dimensions thereof, but the dimensions should be appropriately set in accordance with the application.

A dielectric composition according to this mode of embodiment forming the dielectric layers 7 contains a main component having the following formula (1), and also contains at least one selected from the group consisting of a first auxiliary component (at least one of Li and K) and a second auxiliary component (at least one of Cu, Zn, Mn, Mg or Co), in amounts of at least 0.05 molar parts and no greater than 10 molar parts, with respect 100 molar parts of Ti contained in the main component.

$(Bi_aNa_bSr_cLn_d)TiO_3$  Formula (1)

where Ln is a rare earth element and where a, b, c and d in the composition of formula (1) are within the following numerical value ranges.

0.100≤a≤0.400
0.100≤b≤0.400
0.100≤c≤0.700
0≤d≤0.100
0.900≤a+b+c+d≤1.050.

The dielectric composition includes the main component which has the formula (1) wherein a, b, c and d are in the abovementioned numerical value ranges, and at least one auxiliary component selected from the group consisting of the first auxiliary component and the second auxiliary component, and as a result the dielectric constant when a DC bias is applied at 150° C. is increased. a, b, c and d indicate the ratio of the number of atoms of Bi, Na, Sr and Ln when the number of atoms of Ti is 1. It should be noted that the increase in the dielectric constant when a DC bias is applied is believed to be because the dielectric composition according to this mode of embodiment is closer to a paraelectric than a conventional BaTiO_3-based dielectric composition.

It is possible to provide a dielectric composition having a dielectric constant when a DC bias of at least 8 V/μm is applied at 25° C. of 900 or greater and at 150° C. of 850 or greater, and having a withstand field of at least 15 V/μm at 25° C. and 150° C.

It should be noted that the increase in the dielectric constant of the dielectric composition at 150° C. is believed to be because the temperature at which the dielectric constant of the main component is highest (in the range of −10° C. to 100° C.) moves to the high-temperature side due to the addition of the first auxiliary component and/or the second auxiliary component.

When the dielectric composition does not contain either the first auxiliary component or the second auxiliary component, it is not possible to achieve a dielectric constant of 850 or greater when a DC bias of 8 V/μm is applied at 150° C.

When a is less than 0.100, the paraelectric characteristics of the dielectric composition predominate excessively. This means that the dielectric constant decreases and it is not possible to achieve a dielectric constant of 900 or greater when a DC bias of 8 V/μm is applied at 25° C. Furthermore, when a is greater than 0.400, the insulation resistance decreases and breakdown is likely to occur, so it is not possible to achieve a withstand field of 15 V/μm or greater at 25° C.

When b is less than 0.100, the paraelectric characteristics of the dielectric composition predominate excessively. This means that the dielectric constant decreases and it is not possible to achieve a dielectric constant of 900 or greater when a DC bias of 8 V/μm is applied at 25° C. Furthermore, when b is greater than 0.400, the insulation resistance decreases and breakdown is likely to occur, so it is not possible to achieve a withstand field of 15 V/μm or greater at 25° C.

When c is less than 0.100, the insulation resistance decreases and breakdown is likely to occur, so it is not possible to achieve a withstand field of 15 V/μm or greater at 25° C. Furthermore, if c is greater than 0.700, the paraelectric characteristics of the dielectric composition predominate excessively. It is therefore not possible to achieve a dielectric constant of 900 or greater when a DC bias of 8 V/μm is applied at 25° C.

When d is greater than 0.100, the paraelectric characteristics of the dielectric composition predominate excessively.

It is therefore not possible to achieve a high dielectric constant of 900 or greater when a DC bias of 8 V/μm is applied at 25° C.

When a+b+c+d is less than 0.900 or greater than 1.050, the insulation resistance decreases and breakdown is likely to occur, so it is not possible to achieve a withstand field of 15 V/μm or greater at 25° C.

The first auxiliary component and second auxiliary component contained in the dielectric composition are preferably included in an amount of at least 0.5 molar parts and no greater than 10 molar parts, in terms of the total of the first auxiliary component and the second auxiliary component with respect to 100 molar parts of Ti contained in the dielectric composition. By setting the total content of the first auxiliary component and second auxiliary component at 0.5 molar parts or greater, the peak of the dielectric constant of the main component readily moves by a sufficient amount to the high-temperature side. Furthermore, by setting the total content of the first auxiliary component and the second auxiliary component at 10 molar parts or less, a reduction in insulation resistance at high temperatures is readily prevented and this facilitates obtaining a dielectric composition having a withstand field of 15 V/μm or greater at 150° C.

Furthermore, the first auxiliary component contained in the dielectric composition is preferably included in an amount of at least 0.5 molar parts to less than 7 molar parts with respect to 100 molar parts of Ti contained in the dielectric composition. By setting the content of the first auxiliary component at 0.5 molar parts or greater, the peak of the dielectric constant of the main component readily moves by a sufficient amount to the high-temperature side. Furthermore, by setting the content of the first auxiliary component at less than 7 molar parts, the first auxiliary component is likely to form a solid solution in the full amount in the main phase. It is possible to further improve the dielectric constant by reducing the amount of first auxiliary component that remains inside the sintered compact without forming a solid solution in the main phase. In view of this, it is possible to obtain a dielectric composition having a relatively high dielectric constant of 900 or greater at 25° C. and 150° C. when a DC bias of 8 V/μm or greater is applied, and also having a withstand field of 15 V/μm or greater at 25° C. and 150° C., by including the first auxiliary component in an amount of 0.5 molar parts or greater and less than 7 molar parts.

Furthermore, the second auxiliary component contained in the dielectric composition is preferably included in an amount of at least 0.05 molar parts to less than 5 molar parts with respect to 100 molar parts of Ti contained in the dielectric composition. By setting the content of the second auxiliary component at 0.05 molar parts or greater, the peak of the dielectric constant of the main component readily moves by a sufficient amount to the high-temperature side. Furthermore, by setting the content of the second auxiliary component at less than 5 molar parts, the second auxiliary component is likely to form a solid solution in the full amount in the main phase. It is possible to further improve the dielectric constant by reducing the amount of second auxiliary component that remains inside the sintered compact without forming a solid solution in the main phase. In view of this, it is possible to obtain a dielectric composition having a relatively high dielectric constant of 900 or greater at 25° C. and 150° C. when a DC bias of 8 V/μm or greater is applied, and also having a withstand field of 15 V/μm or greater at 25° C. and 150° C., by including the second auxiliary component in an amount of 0.05 molar parts or greater and less than 5 molar parts.

Furthermore, the effect of the present invention is more pronounced when the dielectric composition according to this mode of embodiment forming the dielectric layers 7 satisfies both of (2) and (3) below, which is more preferable. If both of (2) and (3) below are satisfied, the dielectric constant is 1200 or greater when a DC bias of 8 V/μm or greater is applied at 25° C., and the dielectric constant is moo or greater when a DC bias of 8 V/μm or greater is applied at 150° C. In addition, the withstand field is 15 V/μm or greater at 25° C. and 150° C.

(2) a, b, c and d are in the following numerical value ranges.

$0.150 \le a \le 0.375$
$0.150 \le b \le 0.375$
$0.150 \le c \le 0.600$
$0.010 \le d \le 0.080$
$0.920 \le a+b+c+d \le 1.020$ (3) The content of the first auxiliary component is at least 1 molar part and less than 5 molar parts and/or the content of the second auxiliary component is at least 0.1 molar parts and no greater than 3 molar parts, with respect to 100 molar parts of Ti contained in the dielectric composition.

Furthermore, if Li is included as the first auxiliary component and at least one element from among La, Pr, Nd and Sm is included as Ln, then the content of the first auxiliary component is preferably between 3% and 6%.

An oxide, a mixture or a composite oxide of the elements included in abovementioned formula (1) may be used as the starting material for the dielectric composition, but it is also possible to suitably select the starting material from various compounds which form the abovementioned oxides or composite oxides as a result of baking, e.g., carbonates, oxalates, nitrates, hydroxides and organometallic compounds etc. and these may be mixed for use. The content of each compound in the dielectric starting material should be determined in such a way that the abovementioned dielectric composition is formed after baking.

The content of the main component represented by formula (1) is preferably such as to constitute at least 90 wt %, taking the dielectric composition as a whole as 100 wt %, in order to facilitate achieving a sufficient dielectric constant for practical application as a dielectric composition. Furthermore, the composition may equally contain one or more compounds of elements selected from Ni, Al and Si as a third auxiliary component in addition to the main component and the first and second auxiliary components. There is no particular limitation as to the content of the third auxiliary component, but it is preferably contained in an amount of no greater than 1 molar part with respect to 100 molar parts of Ti contained in the dielectric composition.

In addition, impurities such as P and Zr which may contaminate the inventive dielectric composition during production may equally be included in an amount of 0.5 wt % or less, taking the dielectric composition as a whole as 100 wt %.

The thickness per layer of the dielectric layers 7 may be freely set and there is no particular limitation thereto. The thickness may be 1-100 μm, for example.

The internal electrode layers 6A, 6B are provided in such a way as to be parallel. The internal electrode layers 6A are formed in such a way that one end thereof is exposed at the end surface of the laminated body 5 where the terminal electrode 11A is formed. Furthermore, the internal electrode layers 6B are formed in such a way that one end thereof is exposed at the end surface of the laminated body 5 where the terminal electrode 11B is formed. In addition, the internal electrode layers 6A and internal electrode layers 6B are disposed in such a way that the majority thereof is overlapping in the direction of stacking.

There is no particular limitation as to the material of the internal electrode layers 6A, 6B. Ag, Ag—Pd alloy, Ni or Cu etc. may be used.

The terminal electrodes 11A, 11B are in contact with the ends of the internal electrode layers 6A and the ends of the internal electrode layers 6B, respectively, which are exposed at the end surfaces of the laminated body 5 on which said terminal electrodes 11A, 11B are provided. As a result, the terminal electrodes 11A, 11B are electrically connected to the internal electrode layers 6A, 6B, respectively.

There is no particular limitation as to the material of the terminal electrodes 11A, 11B. They may be constructed from a conductive material having Ag, Au or Cu etc. as the main component, for example. The thickness of the terminal electrodes 11A, 11B may be appropriately set according to the application and the size etc. of the laminated dielectric element, and there is no particular limitation. The thickness of the terminal electrodes 11A, 11B may be 10-50 µm, for example.

A method for producing the laminated ceramic capacitor will now be described.

The laminated ceramic capacitor according to the present invention is produced in the same way as a conventional laminated ceramic capacitor, namely by preparing a green chip using a normal printing method or sheet method employing a paste, baking the green chip and then printing or transcribing external electrodes and then baking. The production method will be described in specific terms below.

The paste for the laminated ceramic layers may be an organic paint comprising a mixture of a dielectric starting material and an organic vehicle, or it may be an aqueous paint comprising a mixture of a dielectric starting material and an aqueous vehicle.

For the dielectric starting material, it is possible to use a metal contained in the main component and the auxiliary component(s), for example, an oxide of an element selected from the group consisting of Bi, Na, Sr, Ln, Ti, Li, K, Cu, Mn, Zn, Mg, Co, Ni, Al and Si, or a mixture thereof, or a composite oxide may be used. In addition, the dielectric starting material may be appropriately selected from various types of compounds which form the abovementioned oxides or composite oxides as a result of baking, e.g., carbonates, oxalates, nitrates, hydroxides and organometallic compounds etc. and these may be mixed for use. The content of each compound in the dielectric starting material should be determined in such a way that the abovementioned dielectric composition is formed after baking. A powder having a mean particle size of the order of 0.1-3 µm is normally used as the dielectric starting material. The mean particle size of the dielectric starting material powder may be adjusted by appropriately adjusting the time for which the starting material is mixed.

When the paste for the dielectric layers is an organic paint, the dielectric starting material and an organic vehicle in which a binder or the like is dissolved in an organic solvent should be mixed. There is no particular limitation as to the binder which is used in the organic vehicle, and it should be appropriately selected from various normal binders such as ethyl cellulose and polyvinyl butyral. Furthermore, there is no particular limitation as to the organic solvent which is used in the organic vehicle, and it should be appropriately selected from various types of organic solvents such as terpineol, butyl carbitol, acetone and toluene, in accordance with the method which is used, namely the printing method or sheet method etc.

Furthermore, when the paste for the dielectric layers is an aqueous paint, the dielectric starting material and an aqueous vehicle in which a water-soluble binder and a dispersant etc. are dissolved in water should be mixed. There is no particular limitation as to the water-soluble binder which is used in the aqueous vehicle, and examples of binders which may be used include polyvinyl alcohol, cellulose and water-soluble acrylic resin.

The paste for the internal electrode layers is prepared by mixing a conductive material comprising various types of the abovementioned metals or alloys, or various types of compounds which form the conductive material after baking, organometallic compounds, resinates, and the like, with the abovementioned organic vehicle or aqueous vehicle. The paste for the external electrodes may be prepared in the same way as the paste for the internal electrodes.

When an organic vehicle is used to prepare the abovementioned pastes, there is no particular limitation as to the content of said organic vehicle. For example, the binder may be present in an amount of the order of 1-5 wt % and the organic solvent may be present in an amount of the order of 10-50 wt %. Furthermore, the pastes may contain additives selected from various types of dispersants, plasticizers, dielectrics, and insulators etc., as required. The total content of these additives is preferably no greater than 10 wt %.

When a printing method is used, the paste for the dielectric ceramic layers and the paste for the internal electrode layers are printed in layers on a substrate made of polyethylene terephthalate (PET) or the like and cut to a predetermined shape, after which they are peeled from the substrate to form a green chip. Furthermore, when the sheet method is used, a green sheet is formed using the paste for the dielectric layers, and the paste for the internal electrode layers is printed on the green sheet, after which the green sheets are stacked to form a green chip.

Before the green chip is baked, a debinding treatment is performed. There is no particular limitation as to the conditions of the debinding treatment and it should be carried out under normal conditions.

The debinding treatment is preferably carried out under the atmosphere or under a reducing atmosphere with a temperature increase rate preferably of 0.1-100° C./hr and more preferably 1-10° C./hr, a holding temperature preferably of 200-500° C. and more preferably 300-450° C., and a temperature holding time of preferably 1-48 hours and more preferably 2-24 hours. Furthermore, the organic component such as the binder component is preferably removed down to around 300 ppm, and more preferably removed down to around 200 ppm.

The atmosphere during baking of the green chip should be appropriately set in accordance with the type of conductive material in the paste for the internal electrode layers, and the baking should be carried out under the atmosphere or under a reducing atmosphere.

Furthermore, the holding temperature during baking is preferably 900-1250° C. and more preferably 950-1150° C. By setting the holding temperature at 900° C. or greater, this makes densification more likely to progress adequately due to baking. Furthermore, by setting the holding temperature at 1250° C. or less, this facilitates suppressing diffusion of the various materials forming the internal electrode layers and abnormal sintering of the internal electrode layers. By suppressing abnormal sintering of the internal electrode layers, this facilitates preventing breakage of the internal electrodes. By suppressing diffusion of the various materials forming the internal electrode layers, this facilitates preventing deterioration of the DC bias characteristics.

The end surfaces of the laminated dielectric element main body obtained in this way are polished by means of barrel polishing or sandblasting, for example, the paste for the external electrodes is printed or transcribed thereon, baking is carried out and the external electrodes are formed. The baking conditions for the paste for the external electrodes are preferably a temperature of 600-800° C. for a time of around 10 minutes to 1 hour. A coating layer is formed by means of plating or the like on the external electrode surface, as required. The laminated ceramic capacitor according to the present invention produced in this way is mounted on a printed circuit board or the like by means of soldering or the like, and used in various types of electronic devices etc.

The laminated ceramic capacitor according to a mode of embodiment of the present invention was described above. The dielectric composition according to the present invention has a high dielectric constant and capacitance when a high DC bias is applied, and therefore it can be advantageously used in a medium- or high-voltage capacitor with a relatively high rated voltage.

Furthermore, the present invention is not limited to the mode of embodiment described above. For example, the dielectric composition according to the present invention may also be used as a dielectric element or the like in a semiconductor device, for example. In addition, the dielectric composition, dielectric element, electronic component and laminated electronic component according to the present invention are also of use in a smoothing capacitor or a snubber capacitor for circuit protection for which there is a need for a high dielectric constant when a high DC bias is applied.

According to the present invention, known structures etc. may be freely used, other than the makeup of the dielectric composition. Furthermore, when the laminated ceramic capacitor is produced, the calcined powder may be produced by a known method such as hydrothermal synthesis, for example. Furthermore, $(Bi_{0.5}Na_{0.5})TiO_3$, $SrTiO_3$ and $La_{0.67}TiO_3$ etc. may also be prepared, mixed with the starting material comprising the first auxiliary component and/or second auxiliary component, and sintered as main-component precursors.

The present invention will be described below in further detail with the aid of exemplary embodiments and comparative examples. However, the present invention is not limited to the following exemplary embodiments. It should be noted that the first auxiliary component may be referred to as "auxiliary component A" and the second auxiliary component may be referred to as "auxiliary component B" in the following description.

In order to produce dielectric compositions, the following starting material powders were prepared, namely starting material powders comprising elements of the main component (bismuth oxide ($Bi_2O_3$), sodium carbonate ($Na_2CO_3$), strontium carbonate ($SrCO_3$), lanthanum hydroxide (La(OH)$_3$), ytterbium oxide ($Yb_2O_3$) samarium oxide ($Sm_2O_3$), cerium oxide ($CeO_2$), yttrium oxide ($Y_2O_3$), praseodymium oxide ($Pr_6O_{11}$), neodymium oxide ($Nd_2O_3$), gadolinium oxide ($Gd_2O_3$), terbium oxide($Tb_4O_7$), dysprosium oxide ($Dy_2O_3$), holmium oxide ($Ho_2O_3$), terbium oxide ($Er_2O_3$) and titanium oxide ($TiO_2$)), and starting material powders comprising elements of the auxiliary components (lithium carbonate ($Li_2CO_3$), potassium carbonate ($K_2CO_3$), copper oxide (CuO), zinc oxide (ZnO), manganese oxide ($MnO_2$), magnesium oxide (MgO) and cobalt oxide ($Co_3O_4$)). The starting material powders were adjusted and weighed in such a way that the dielectric composition after baking (the sintered compact) satisfied the compositions in tables 1 to 4 shown below. It should be noted that a, b, c and d in table 1 to table 4 (FIGS. 4-7) denote numerical values of a, b, c and d in the following formula (1). Furthermore, the starting material powders of the auxiliary components were adjusted and weighed in such a way that the sintered compact contained the amounts of the auxiliary components shown in table 1 to table 4.

$(Bi_aNa_bSr_cLn_d)TiO_3$  Formula (1)

Ln in the exemplary embodiments and comparative examples in table 1 to table 3 is one type of element selected from the group consisting of La, Yb, Sm and Ce. Ln in the exemplary embodiments in table 4 is one or two types of elements selected from the group consisting of Y, La, Ce, Pr, Nd, Sm, Gd, Tb, Dy, Ho, Er and Yb. When two types of elements were selected, the respective contents thereof were in a ratio of 1:1 as a molar conversion.

The weighed starting material powders were wet-mixed using a ball mill to obtain mixtures. After this, the mixtures were calcined for two hours under the air at 750-850° C. to obtain calcined material. The calcined material was then wet-ground using a ball mill to obtain calcined powders.

An organic solvent and an organic vehicle were then added to the calcined powders, the material was wet-mixed using a ball mill and paste for dielectric layers was prepared.

In addition, conductive material powder and an organic vehicle were mixed separately from the paste for the dielectric layers to prepare paste for the internal electrode layers. Ag, Ag—Pd alloy or Cu etc. was used as the conductive material powder.

The paste for dielectric layers was then moulded into sheets by means of a sheet-moulding method and ceramic green sheets having a thickness of 10 μm were obtained.

The paste for the internal electrode layers was coated on the resulting ceramic green sheets by means of screen printing to print the internal electrode layers, the printed sheets were then stacked, after which they were cut into cuboid shapes having dimensions of 4.5×4.3×1.0 mm, whereby laminated green chips were prepared. The thickness of the internal electrode layers was 2 μm. Furthermore, the number of laminations of the dielectric layers was 10. The laminated green chips were subjected to debinding at 300° C.-500° C. to remove the organic component down to around 300 ppm, and baking was carried out under the atmosphere or under a reducing atmosphere at 900° C.-1250° C. After the baking, the exposed surfaces of the internal electrodes were polished, a paste for the external electrodes having Ag or Cu as a conductive material was applied thereto, and laminated ceramic capacitors were obtained.

The composition of the resulting laminated ceramic capacitors was analysed. The compositional analysis was carried out by X-ray fluorescence and inductively coupled plasma (ICP) optical emission spectroscopy. As a result, it was confirmed that the compositions of the laminated ceramic capacitors were the same as the compositions shown in tables 1 to 3.

The dielectric constant (ε), when a DC bias of 8 V/μm was applied at room temperature (25° C.) and 150° C. with a superimposed AC voltage being applied at an effective value of 0.1 V/μm, was measured for each of the resulting laminated ceramic capacitors.

A DC high-voltage power source (Glassman High Voltage, WX10P90) was connected to a digital LCR meter (Hewlett-Packard, 4284A), and the dielectric constant was measured by said digital LCR meter at room temperature (25° C.) and 150° C. while a DC bias of 8 V/μm was applied.

The withstand field at 25° C. and 150° C. was obtained by gradually applying a voltage and measuring the voltage producing breakdown using a DC high-voltage power source (Glassman High Voltage, WX10P90).

The dielectric constant when a DC bias of 8 V/μm was applied at room temperature (25° C.) and 150° C. in the exemplary embodiments and comparative examples, and the withstand field at 25° C. and 150° C. are shown in tables 1 to 3. A dielectric constant of 900 or greater when a DC bias of 8 V/μm was applied at 25° C., and a dielectric constant of 850 or greater when a DC bias of 8 V/μm was applied at 150° C. and a withstand field of 15 V/μm or greater at 25° C. and 150° C., were deemed to be good.

Furthermore, a dielectric constant of 900 or greater when a DC bias of 8 V/μm was applied at 25° C. and 150° C. and a withstand field of 15 V/μm or greater at 25° C. and 150° C. was deemed to be better.

Figure 4:
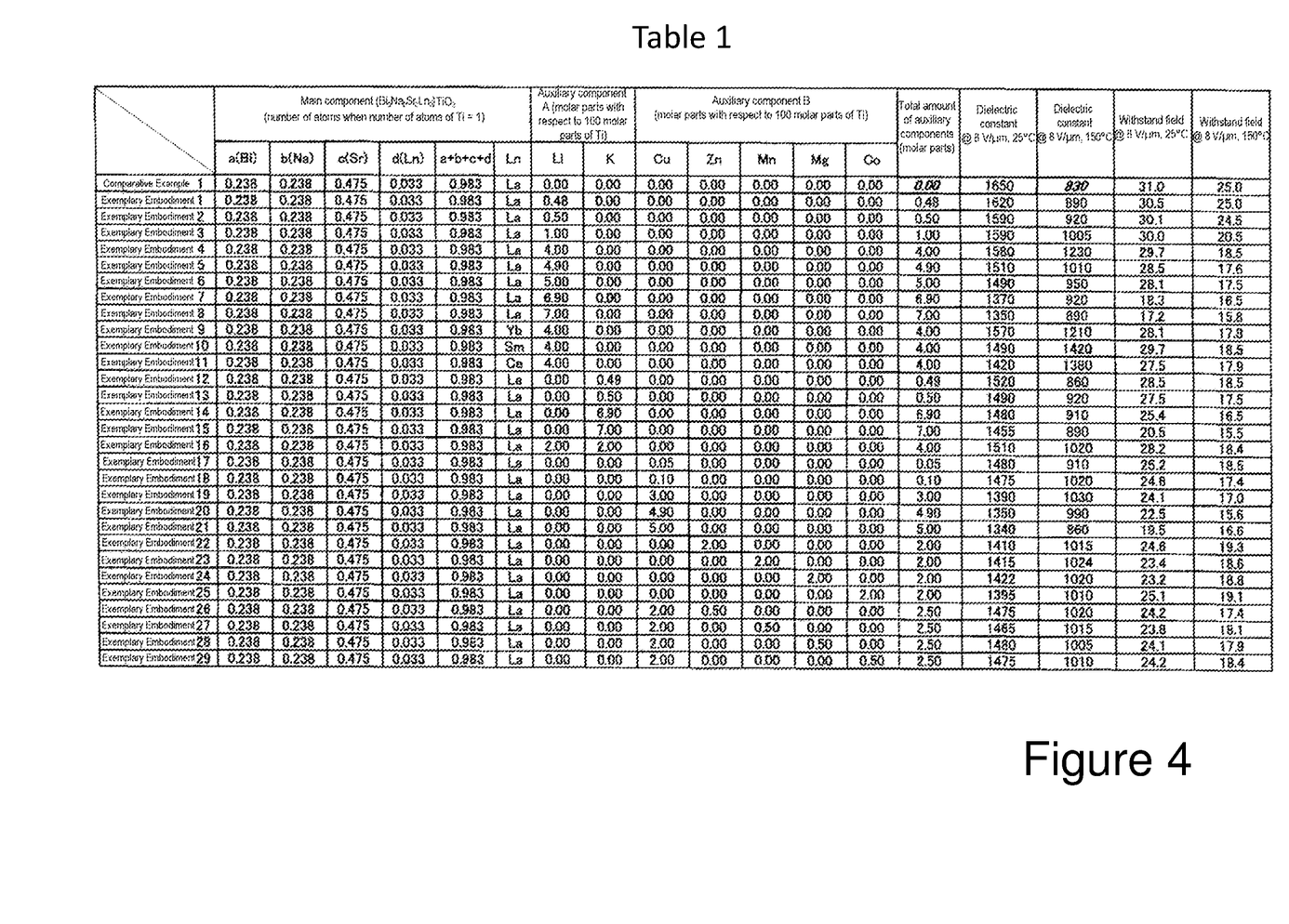
Figure 5:
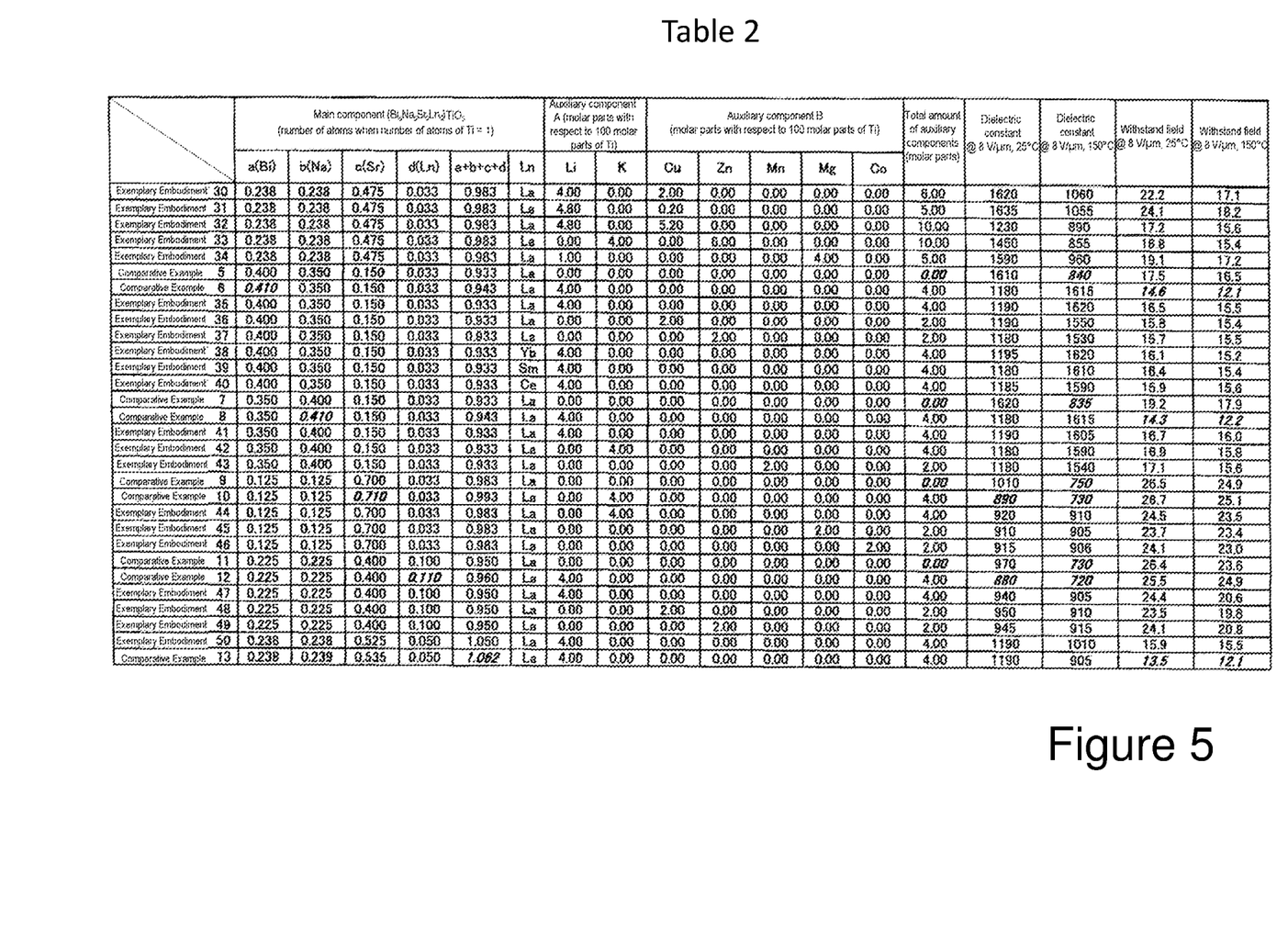
Figure 6:
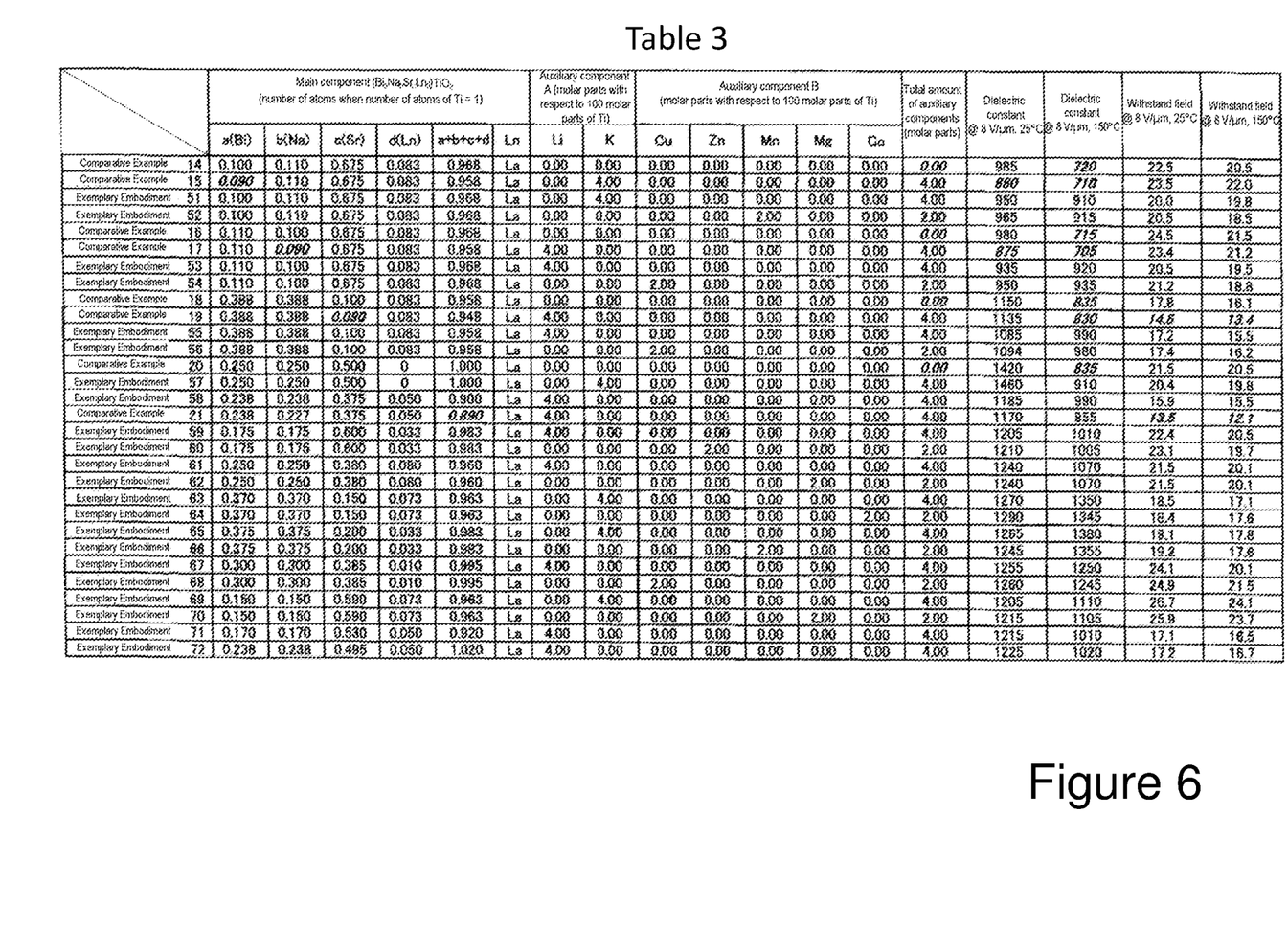

FIGS. 4-6 provide tables 1 to 3, respectively. The laminated ceramic capacitors according to the exemplary embodiments shown in tables 1 to 3 satisfied the following in terms of a, b, c and d, namely $0.100 \leq a \leq 0.400$, $0.100 \leq b \leq 0.400$, $0.100 \leq c \leq 0.700$, $0 \leq d \leq 0.100$ and $0.900 \leq a+b+c+d \leq 1.050$. In addition, said laminated ceramic capacitors also contained at least one selected from the group consisting of the first auxiliary component (at least one of Li and K) and the second auxiliary component (at least one of Cu, Zn, Mn, Mg and Co). The total content of the first auxiliary component and the second auxiliary component was between 0.05 molar parts and 10 molar parts with respect to 100 molar parts of Ti contained in the main component.

The laminated ceramic capacitors according to the exemplary embodiment shown in tables 1 to 3 had a dielectric constant of 900 or greater when a DC bias of 8 V/μm was applied at 25° C., and a dielectric constant of 850 or greater when a DC bias of 8 V/μm was applied at 150° C. and a withstand field of 15 V/μm or greater at 25° C. and 150° C. Furthermore, laminated ceramic capacitors having good characteristics were still obtained whichever of La, Yb, Sm and Ce was used as the Ln.

The laminated ceramic capacitors according to the exemplary embodiments shown in tables 1 to 3 in which the first auxiliary component was included in an amount of at least 0.5 molar parts but less than 7 molar parts with respect to 100 molar parts of Ti contained in the dielectric composition had a dielectric constant of 900 or greater when a DC bias of 8 V/μm was applied at 25° C. and 150° C., and a withstand field of 15 V/μm or greater at 25° C. and 150° C.

The laminated ceramic capacitors according to the exemplary embodiments shown in tables 1 to 3 in which the second auxiliary component was included in an amount of at least 0.05 molar parts but less than 5 molar parts with respect to 100 molar parts of Ti contained in the dielectric composition had a dielectric constant of 900 or greater when a DC bias of 8 V/μm was applied at 25° C. and 150° C., and a withstand field of 15 V/μm or greater at 25° C. and 150° C.

In addition, some of the exemplary embodiments of the laminated ceramic capacitors from among the exemplary embodiments shown in tables 1 to 3 satisfied the following in terms of a, b, c and d, namely $0.150 \leq a \leq 0.375$, $0.150 \leq b \leq 0.375$, $0.150 \leq c \leq 0.600$, $0.010 \leq d \leq 0.080$, $0.920 \leq a+b+c+d \leq 1.020$. In addition, said laminated ceramic capacitors also contained at least 1 molar part but less than 5 molar parts of the first auxiliary component (at least one of Li and K) and/or between 0.1 molar parts and 3 molar parts of the second auxiliary component (at least one of Cu, Zn, Mn, Mg and Co) with respect to 100 molar parts of Ti contained in the main component.

In some of the exemplary embodiments, the effect of the present invention was especially marked. In some of the exemplary embodiments, the dielectric constant was 1200 or greater when a DC bias of 8 V/μm was applied at 25° C., the dielectric constant was woo or greater when a DC bias of 8 V/μm was applied at 150° C., and the withstand field was 15 V/μm or greater at 25° C. and 150° C.

In some of the exemplary embodiments in Table 4, at least one element from among La, Pr, Nd and Sm is included, and the content of the first auxiliary component (Li) is between 3 molar parts and 6 molar parts. Table 4 is provided in FIG. 7.

The advantage of the present invention is particularly striking in some of the exemplary embodiments. In some of the exemplary embodiments, the dielectric constant when a DC bias of 8 V/μm was applied at 25° C. was 1200 or greater, the dielectric constant when a DC bias of 8 V/μm was applied at 150° C. was 1300 or greater, and the withstand field at 25° C. and 50° C. was 18 V/μm or greater.

Furthermore, the magnitude of the DC bias applied at 25° C. was varied and the dielectric constant was measured for the laminated ceramic capacitor according to Exemplary Embodiment 4. The results of measuring the dielectric constant are shown in FIG. 2 together with a schematic representation of the change in dielectric constant of a conventional $BaTiO_3$-based capacitor sample.

Figure 2:
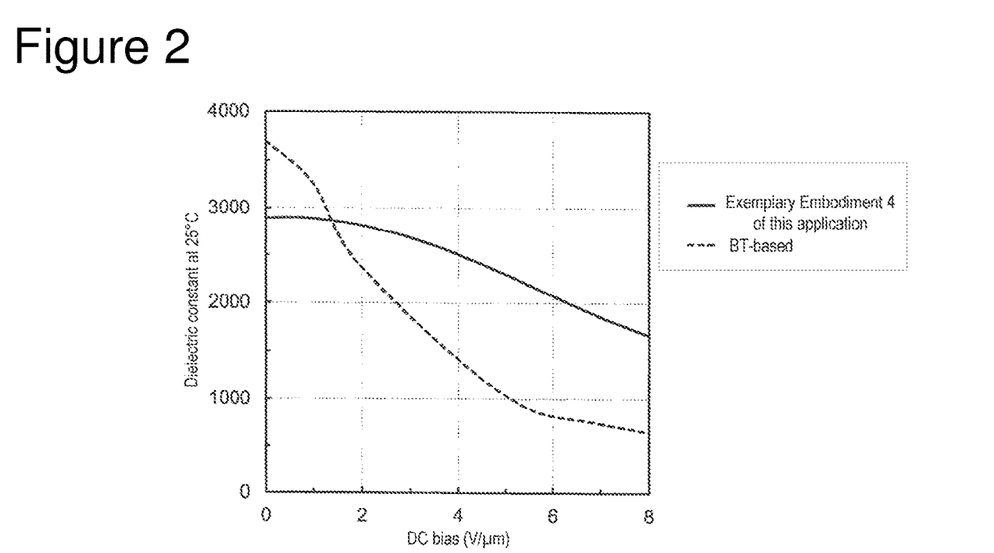
FIG. 2 is a graph showing the change in dielectric constant with respect to changes in DC bias.

It is clear from FIG. 2 that there is a sharp drop in the dielectric constant of the conventional $BaTiO_3$-based capacitor sample as the applied DC bias increases, whereas there is no great drop in the dielectric constant of the laminated ceramic capacitor having the dielectric composition according to the invention of this application, even when the DC bias is large, and a high dielectric constant is maintained. This is believed to be because the dielectric composition according to the invention of this application is closer to a paraelectric than the conventional $BaTiO_3$-based dielectric composition.

Figure 3:
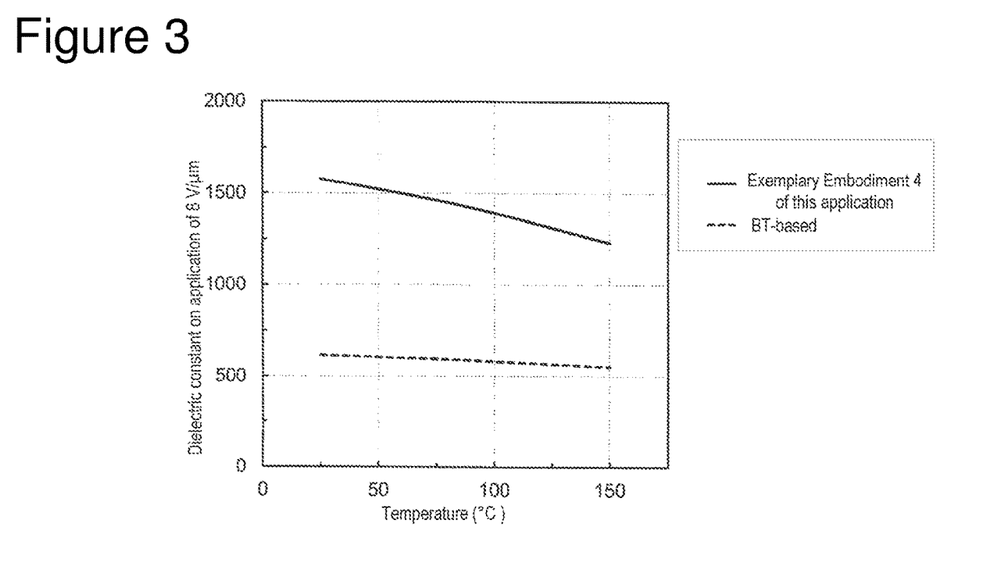
FIG. 3 is a graph showing the change in dielectric constant with respect to changes in temperature.

In addition, the dielectric constant of the laminated ceramic capacitor according to Exemplary Embodiment 4 was measured when a DC bias voltage of 8 V/μm was applied while the temperature was varied from 25° C. up to 150° C. The measurement results are shown in table 3 together with a schematic representation of the change in dielectric constant of a conventional $BaTiO_3$-based capacitor sample.

It is clear from FIG. 3 that the laminated ceramic capacitor having the dielectric composition according to the invention of this application achieves a dielectric constant of 850 or greater in the range of 25° C. to 150° C. when a DC bias of 8 V/μm is applied, so the dielectric constant is higher than that of the conventional $BaTiO_3$-based capacitor sample.

The invention claimed is:

1. A dielectric composition comprising:
   a main component represented by $(Bi_aNa_bSr_cLn_d)TiO_3$, where
   Ln comprises a rare earth element;
   $0.100 \leq a \leq 0.400$;
   $0.100 \leq b \leq 0.400$
   $0.100 \leq c \leq 0.700$;
   $0 \leq d \leq 0.100$; and
   $0.900 \leq a+b+c+d \leq 0.050$; and
   an auxiliary component containing a first auxiliary component or a second auxiliary component,
   wherein the first auxiliary component comprises, and
   wherein the second auxiliary component comprises an element selected from the group consisting of Cu, Zn, Co and combinations thereof.

2. The dielectric composition according to claim 1, wherein the auxiliary component contains both the first auxiliary component and the second auxiliary component.

3. The dielectric composition according to claim 1, wherein the dielectric composition contains at least 0.5 molar parts and less than 7 molar parts of the first auxiliary component, with respect to 100 molar parts of Ti contained in the main component.

4. The dielectric composition according to claim 1, wherein the dielectric composition contains at least 0.05 molar parts and less than 5 molar parts of the second auxiliary component, with respect to 100 molar parts of Ti contained in the main component.

5. A laminated electronic component comprising:
a laminated portion formed by alternately laminating a plurality of internal electrode layers and dielectric layers, each dielectric layer comprising the dielectric composition according to claim 1.

6. The laminated electronic component according to claim 5, wherein the internal electrode layers are formed using a paste, and wherein the paste is prepared by mixing a conductive material comprising metals, alloys, or compounds that form the conductive material after baking, organometallic compounds and resinates with an organic vehicle or an aqueous vehicle.

7. The laminated electronic component according to claim 5, wherein the internal electrode layers comprise Ag, Ag—Pd alloy, Ni or Cu.

8. The laminated electronic component according to claim 5, further comprising terminal electrodes constructed from a conductive material.

9. The laminated electronic component according to claim 8, wherein the terminal electrodes having comprise Ag, Au or Cu as a main component.

10. The laminated electronic component according to claim 5, wherein the laminated electronic component is a laminated ceramic capacitor.

* * * * *

UNITED STATES PATENT AND TRADEMARK OFFICE
CERTIFICATE OF CORRECTION

PATENT NO. : 10,501,374 B2
APPLICATION NO. : 15/577318
DATED : December 10, 2019
INVENTOR(S) : Tomohiro Terada et al.

It is certified that error appears in the above-identified patent and that said Letters Patent is hereby corrected as shown below:

In the Claims

In Column 14, Line 13, Claim 9, delete "the terminal electrodes having comprise" and insert --the terminal electrodes comprise--.

Signed and Sealed this
Thirty-first Day of March, 2020

Andrei Iancu
*Director of the United States Patent and Trademark Office*